(12) United States Patent
Uchimi et al.

(10) Patent No.: US 7,509,271 B2
(45) Date of Patent: Mar. 24, 2009

(54) COLOR-DESIGNATING SERVER, COLOR-DESIGNATING RECEIVING/ORDERING SYSTEM, COLOR-DESIGNATING METHOD, COLOR-DESIGNATING RECEIVING/ORDERING METHOD, AND RECORDING MEDIUM

(75) Inventors: Hideki Uchimi, Tatebayashi (JP); Yoshiro Tomita, Tatebayashi (JP); Hiroki Goto, Hanyu (JP); Mitsuo Hatanaka, Osaka (JP); Masaki Okauchi, Saitama (JP); Masaaki Nakagawa, Tokyo (JP); Masami Shishikura, Chiba (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 651 days.

(21) Appl. No.: 10/026,823

(22) Filed: Dec. 27, 2001

(65) Prior Publication Data
US 2002/0082944 A1    Jun. 27, 2002

(30) Foreign Application Priority Data
Dec. 27, 2000 (JP) ............................ P2000-399411

(51) Int. Cl.
*G06Q 40/00* (2006.01)
(52) U.S. Cl. .......................................... 705/26; 705/27
(58) Field of Classification Search ................. 705/26, 705/27
See application file for complete search history.

(56) References Cited

U.S. PATENT DOCUMENTS 5,383,111 A * 1/1995 Homma et al. ................. 705/27

| | | | |
|---|---|---|---|
| 5,758,332 A | 5/1998 | Hirotani | 707/1 |
| 5,870,771 A | 2/1999 | Oberg | 707/502 |
| 6,507,824 B1 * | 1/2003 | Yon et al. | 705/26 |
| 6,714,926 B1 * | 3/2004 | Benson | 707/2 |

FOREIGN PATENT DOCUMENTS

| JP | 05-282414 | 10/1993 |
|---|---|---|
| JP | 2000-172835 | 6/2000 |
| KR | 2000-0037218 | 7/2000 |
| KR | 2000-0054468 | 9/2000 |

OTHER PUBLICATIONS

Gralla, Preston, "How the Internet Works", Aug. 1999, Que, Millennium Edition, p. 261.*
Chinese Office Action dated Aug. 5, 2005 corresponding to Chinese Patent Application No. 01143422.8.
Japanese language Office Action for Japanese Application No. 2001-84918, mailed Sep. 27, 2007.

* cited by examiner

*Primary Examiner*—Richard C. Weisberger
(74) *Attorney, Agent, or Firm*—Edwards, Angell, Palmer & Dodge LLP

(57) ABSTRACT

Disclosed are a color-designating server which can display a screen for designating color at a user terminal, which can be connected to a network, a color-designating method, and a recording medium. A matchable color database stores data required for determining matchable colors in a color-designating server which displays a screen for designating color at a user terminal. A conditions-designating processor transmits a conditions-designating screen for designating conditions data, required for determining the matchable colors, to the user terminal. A color data transmission processor determines colors which can be matched under the conditions specified by the conditions data, designated in the conditions-designating screen, by consulting the matchable color database, and transmits the result to the user terminal.

16 Claims, 12 Drawing Sheets

Fig. 10A

MATCHABLE COLOR DATABASE

• RESIN DATA
 USE, PROPERTIES, COST
• DYE MATERIAL DATA
 USE, PROPERTIES, COST
• ADDITIVE DATA
 USE, PROPERTIES, COST
• BASIC COLOR DATA
 RAW MATERIALS, USE, PROPERTIES, COST, SPECTRAL REFLECTION
• EXISTING COLOR DATA
 RAW MATERIALS, USE, PROPERTIES, COST, SPECTRAL REFLECTION

Fig. 10B

CUSTOMER DATABASE

• USER ID
• PASSWORD
• GENERAL DATA
 NAME, ADDRESS, CONTACT INFORMATION
• USE DATA
 USE, MOLDING METHOD RESIN
• HISTORY DATA
• COST DATA
 UNIT-PRICE DATA OF PREVIOUS TRANSACTIONS

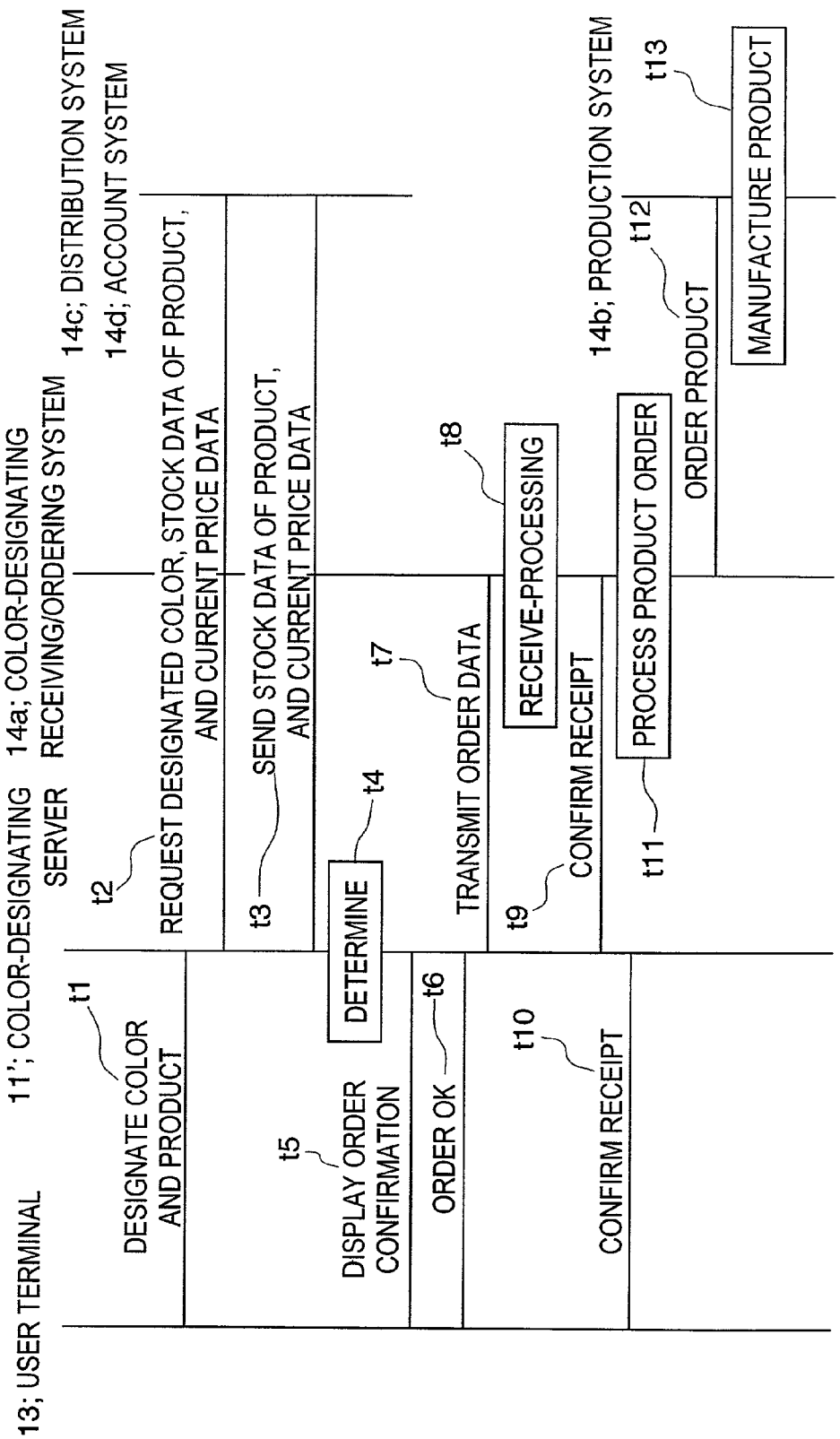

COLOR-DESIGNATING SERVER, COLOR-DESIGNATING RECEIVING/ORDERING SYSTEM, COLOR-DESIGNATING METHOD, COLOR-DESIGNATING RECEIVING/ORDERING METHOD, AND RECORDING MEDIUM

BACKGROUND OF THE INVENTION

1. Field of the Invention

The present invention relates to a color-designating server for displaying a screen for color-designation to a user terminal which can be connected to a network, a color-designating receiving/ordering system, a color-designating method, a color-designating receiving/ordering method, and a recording medium.

2. Description of the Related Art

Conventionally, when manufacturing a product from colored resin, the orderer designates his desired color by means of a color sample such as color books and cuttings from magazines, and the receiver repeatedly attempts to make the product from resin of the same color as that designated by the orderer until the orderer is satisfied with the color achieved.

As described above, there is no specific method whereby the orderer can designate a color. Furthermore, the color samples which have been presented to the orderer may not exactly match the color he desires, and it becomes problematic for him to accurately describe the color he desires. Some color regions cannot be matched by combinations of resins and dyes or pigments. However, since the orderer does not know this, he may designate a color which cannot be reproduced.

SUMMARY OF THE INVENTION

The present invention has been realized in consideration of the circumstances described above, and aims to enable a user (the above-mentioned orderer) to accurately communicate a color he desires by providing a color-designating server for displaying a screen for color-designation to a user terminal which can be connected to a network, a color-designating method, and a recording medium.

It is another object of the present invention to provide a color-designating server for displaying a screen for color-designation to a user terminal, which can be connected to a network, and providing realizable color data to the user, a color-designating receiving/ordering system, a color-designating method, a color-designating receiving/ordering method, and a recording medium.

In order to achieve the above objects, the present invention provides a color-designating server which displays a screen for designating color at a user terminal, which can be connected to a network. The color-designating server comprises a matchable color database which stores data required for determining matchable colors; a conditions-designating processing unit which transmits a conditions-designating screen for designating conditions data, required for determining the matchable colors, to the user terminal; and a color data transmitting unit which determines colors which can be matched under the conditions specified by the conditions data, designated in the conditions-designating screen, by consulting the matchable color database, and transmits a result to the user terminal.

Since the color-designating server comprises the matchable color database which stores data required for determining matchable colors; the conditions-designating processing unit which transmits the conditions-designating screen for designating conditions data, required for determining the matchable colors, to the user terminal; and the color data transmitting unit which determines colors which can be matched under the conditions specified by the conditions data, designated in the conditions-designating screen, by consulting the matchable color database, and transmits a result to the user terminal, the conditions data for adding restrictions, such as requirements, is received based on data stored in the matchable color database, thereby enabling data relating to colors which can be matched within the restrictions of the conditions data to be supplied to the user.

Furthermore, in the color-designating server of the present invention, the data required for determining the matchable colors may comprise at least the type of resin, the type of dye or pigment, and the ratio when matching them.

In this case, since the data required for determining the matchable colors comprises at least the type of resin, the type of dye or pigment, and the ratio when matching them, data relating to the matchable colors can be supplied to the user by receiving conditions data relating to the resins and dyes or pigments and the like.

Furthermore, in the color-designating server of the present invention, the color data transmitting unit may provide a color gamut, comprising a region of colors which can be matched from the matchable colors, in a color space, and may transmit data for displaying a color-designating screen for enabling colors to be designated in the color gamut to the user terminal.

In this case, since the color data transmitting unit provides a color gamut, comprising a region of colors which can be matched from the matchable colors, in a color space, and transmits data for displaying a color-designating screen for enabling colors to be designated in the color gamut to the user terminal, it is easy to visually inform the user of the range of matchable colors.

Furthermore, in the color-designating server of the present invention, the matchable color database may further store basic color data relating to a plurality of basic colors, determined by combining resins and dyes or pigments; and the color data transmitting unit determines a color gamut, comprising a region of matchable colors which can be matched from the basic colors under the conditions determined by the conditions data, by consulting the matchable color database, and may transmit the result to the user terminal.

In this case, since the matchable color database further stores basic color data relating to a plurality of basic colors, determined by combining resins and dyes or pigments, and the color data transmitting unit determines a color gamut, comprising a region of matchable colors which can be matched from the basic colors under the conditions determined by the conditions data, by consulting the matchable color database, and transmits the result to the user terminal, data relating to the matchable colors can be determined more accurately when using a variety of methods for matching colors by arranging combinations of multiple basic colors.

Furthermore, in the color-designating server of the present invention, the matchable color database may further store color sample data relating to colors of color samples; and the color data transmission unit may determine color samples which can be matched under the conditions, determined by the conditions data, by consulting the matchable color database, and transmits the result to the user terminal.

In this case, since the matchable color database further stores color sample data relating to colors of color samples; and the color data transmission unit determines color samples which can be matched under the conditions, determined by the conditions data, by consulting the matchable color database, and transmits the result to the user terminal, colors can easily be selected from the color samples which are prepared from actual resin color samples.

Furthermore, the color-designating server of the present invention may further comprise a color data receiving unit which receives color data relating to a color which was designated from the matchable colors; an arrangement calculating unit which calculates an arrangement ratio of resins and dyes or pigments based the received color data; and an arrangement result transmitting unit which transmits arrangement result data, output from the arrangement calculating unit, to the user terminal.

In this case, since the color-designating server further comprises a color data receiving unit which receives color data relating to a color which was designated from the matchable colors; an arrangement calculating unit which calculates an arrangement ratio of resins and dyes or pigments based the received color data; and an arrangement result transmitting unit which transmits arrangement result data, output from the arrangement calculating unit, to the user terminal, it is possible to inform the user of arrangement ratio data and arrangement result data in the resin of the color he desires.

Furthermore, the color-designating server of the present invention may further comprise a use data receiving unit which receives use data relating to an item to be colored from the user terminal; and, the conditions-designating processing unit may transmit the conditions-designating screen, specifying the types of resin and dye or pigment in accordance with the use data, to the user terminal.

In this case, since the color-designating server of the present invention further comprises a use data receiving unit which receives use data relating to an item to be colored from the user terminal, and the conditions-designating processing unit transmits the conditions-designating screen, specifying the types of resin and dye or pigment in accordance with the use data, to the user terminal, the user can easily make a selection from pre-restricted resins and dyes or pigments. Moreover, various conditions can be set in accordance with requirements.

The color-designating server of the present invention may further comprise a customer database which stores user information, comprising use information relating to items to be colored, in correlation with user ID, specifying users of the color-designating server. When the user has been identified, the conditions-designating processing unit transmits the conditions-designating screen, specifying the types of resin and dye or pigment in accordance with the use data of the user, which was obtained by consulting the customer database, to the user terminal.

In this case, since color-designating server further comprises a customer database which stores user information, comprising use information relating to items to be colored, in correlation with user ID, specifying users of the color-designating server; and, when the user has been identified, the conditions-designating processing unit transmits the conditions-designating screen, specifying the types of resin and dye or pigment in accordance with the use data of the user, which was obtained by consulting the customer database, to the user terminal, conditions can be set by displaying only information relating to resins, dye or pigment, and the like, which is of relevance to the user, based on the user's field of business, previous orders, and the like.

Furthermore, in the color-designating server of the present invention, the conditions-designating processing unit may transmit the conditions-designating screen further comprising means of designating requirements, according to the requirements of the user, obtained by consulting the customer database.

In this case, since the conditions-designating processing unit transmits the conditions-designating screen further comprising means of designating requirements, according to the requirements of the user, obtained by consulting the customer database, the user can further restrict the conditions displayed in the conditions-designating screen relating to resins, dyes or pigments, and the like, which are of relevance to himself.

Furthermore, the color-designating server of the present invention may further comprise a virtual item coloring processing unit which displays a virtual item conforming to actual requirements in two-dimensions or three-dimensions in the color-designating screen, colors the virtual item in the color which has been designated from the matchable colors, and allows the color to be confirmed.

In this case, since the color-designating server further comprises a virtual item coloring processing unit which displays a virtual item conforming to actual requirements in two-dimensions or three-dimensions in the color-designating screen, colors the virtual item in the color which has been designated from the matchable colors, and allows the color to be confirmed, it is possible to designate color by using an image of the manufactured product.

Furthermore, the color-designating server of the present invention may further comprise a cost-calculating unit which calculates a cost based on data relating to resins and dyes or pigments which is determined uniquely by arrangement result data, output by the arrangement calculation processing unit; the arrangement result transmitting unit transmits the arrangement result data including cost data.

In this case, since the color-designating server further comprises a cost-calculating unit which calculates a cost based on data relating to resins and dyes or pigments which is determined uniquely by arrangement result data, output by the arrangement calculation processing unit, and the arrangement result transmitting unit transmits the arrangement result data including cost data, the user can obtain cost data simultaneous to designating the color of the resin.

The color-designating receiving/ordering system of the present invention comprises at least a color-designating server which displays a screen for designating color at a user terminal, which can be connected to a network, and a receive-order system which receives order data, received from the user terminal by the color-designating server. The color-designating server comprises a matchable color database which stores data required for determining matchable colors; a conditions-designating processing unit which transmits a conditions-designating screen for designating conditions data, required for determining the matchable colors, to the user terminal; and a color data transmitting unit which determines colors which can be matched under the conditions specified by the conditions data, designated in the conditions-designating screen, by consulting the matchable color database, and transmits a result to the user terminal; a receiving unit which, when a color has been designated from the matchable colors, and a product in the color has been designated, receives designated product data for specifying the color and the product, and order data, from the user terminal; and a transmitting unit which transmits the designated product data and the order data to the receive-order system; the receive-order system comprising a receive-order unit which performs receive-order processing based on the order data, which has been received.

Since the color-designating server comprises the color data transmitting unit which determines colors which can be matched under the conditions specified by the conditions data, designated in the conditions-designating screen, and transmits the result to the user terminal; a receiving unit which, when a color has been designated from the matchable colors, and a product in the color has been designated, receives designated product data for specifying the color and the product, and order data, from the user terminal; and a transmitting unit which transmits the designated product data and the order data to the receive-order system; and the receive-order system comprises a receive-order unit which performs receive-order processing based on the order data, which has been received, the order for the color and product which have been designated by the color-designating server, can be processed, and the receive-order system can receive-process the product.

The color-designating receiving/ordering system may further comprise a distribution system which manages the stock number of the products; and the color-designating server may further comprise an available stock confirming unit which extracts stock data of a product corresponding to the designated product data from the distribution system, and determines whether it can be ordered; and a transmitting unit which transmits the result of the determination to the user terminal.

In this case, since the color-designating receiving/ordering system further comprises a distribution system which manages the stock number of the products; and the color-designating server further comprises an available stock confirming unit which extracts stock data of a product corresponding to the designated product data from the distribution system, and determines whether it can be ordered; and a transmitting unit which transmits the result of the determination to the user terminal, it is possible to incorporate the stock data of the distribution system and thereby prevent the placing of pointless orders, such as an order for a product which is not in stock.

The color-designating receiving/ordering system may further comprise an account system which manages data relating to the cost of the product; and the color-designating server may further comprise a price supplying unit which extracts current price data of materials used in a product, which has been specified in the designated-product data, from the account system, and supplies a price of the product reflecting the current price to the user terminal.

In this case, since the color-designating receiving/ordering system further comprises an account system which manages data relating to the cost of the product; and the color-designating server further comprises a price supplying unit which extracts current price data of materials used in a product, which has been specified in the product-product data, from the account system, and supplies a price of the product reflecting the current price to the user terminal, it is possible to provide the user with a product price which uses a current price reflecting contracts with other clients, and the like.

Furthermore, in the color-designating receiving/ordering system of the present invention, the receive-order system may further comprise a product ordering unit which creates product order data for issuing a command to manufacture a product based on receive-order data, processed by the receive-order unit, and performs order-processing, and a manufacturing system which receives the product order data from the receive-order system, and manufactures a product based on the product order data.

In this case, since the receive-order system further comprises a product ordering unit which creates product order data for issuing a command to manufacture a product based on receive-order data, processed by the receive-order unit, and performs order-processing, and a manufacturing system which receives the product order data from the receive-order system, and manufactures a product based on the product order data, it is possible to provide services from receiving a product order, including color-designation, from the user terminal, to transmitting a command to manufacture the product to the manufacturing system.

The color-designating method of the present invention displays a screen for designating color at a user terminal, which can be connected to a network. The color-designating method comprises a first step of transmitting a conditions-designating screen for designating conditions data, required for determining matchable colors, to the user terminal; and a second step of determining colors which can be matched under the conditions specified by the conditions data, designated in the conditions-designating screen, by consulting the matchable color database, and transmitting the result to the user terminal.

In the color-designating method of the present invention, the second step may comprise providing a color gamut, comprising a region of colors which can be matched from the matchable colors, in a color space, and transmitting data for displaying a color-designating screen for enabling colors to be designated in the color gamut to the user terminal.

Furthermore, the color-designating receiving/ordering method of the present invention uses a color-designating server which displays a screen for designating color at a user terminal, which can be connected to a network, and a receive-order system which receives order data, received from the user terminal by the color-designating server. The color-designating receiving/ordering method comprising the steps of the color-designating server transmitting a conditions-designating screen for designating conditions data, required for determining the matchable colors, to the user terminal; the color-designating server determining colors which can be matched under the conditions specified by the conditions data, designated in the conditions-designating screen, by consulting the matchable color database, and transmitting the result to the user terminal; when a color has been designated from the matchable colors, and a product in the color has been designated, the color-designating server receiving designated product data for specifying the color and the product, and order data, from the user terminal; the color-designating server transmitting the designated product data and the order data to the receive-order system; and the receive-order system performing receive-order processing based on the order data, which has been received.

The present invention provides a computer-readable recording medium, in which a program of the color-designating method for displaying a screen for designating color at a user terminal, which can be connected to a network, is recorded. The program comprises a first step of transmitting a conditions-designating screen for designating conditions data, required for determining matchable colors, to the user terminal; and a second step of determining colors which can be matched under the conditions specified by the conditions data, designated in the conditions-designating screen, by consulting the matchable color database, and transmitting the result to the user terminal.

BRIEF DESCRIPTION OF THE DRAWINGS

FIGS. 10A and 10B are diagrams showing the constitution of a database 102 in an embodiment of the present invention;

FIG. 14 is a flowchart showing the operation of a color-designating receiving/ordering system 10 according to an embodiment of the present invention.

DESCRIPTION OF THE PREFERRED EMBODIMENTS

Embodiments of the present invention will be explained. The following embodiments do not restrict the invention as described in the patent claims, and the combinations of the features described in the embodiments are not all required in the solving means of the invention.

Figure 1:
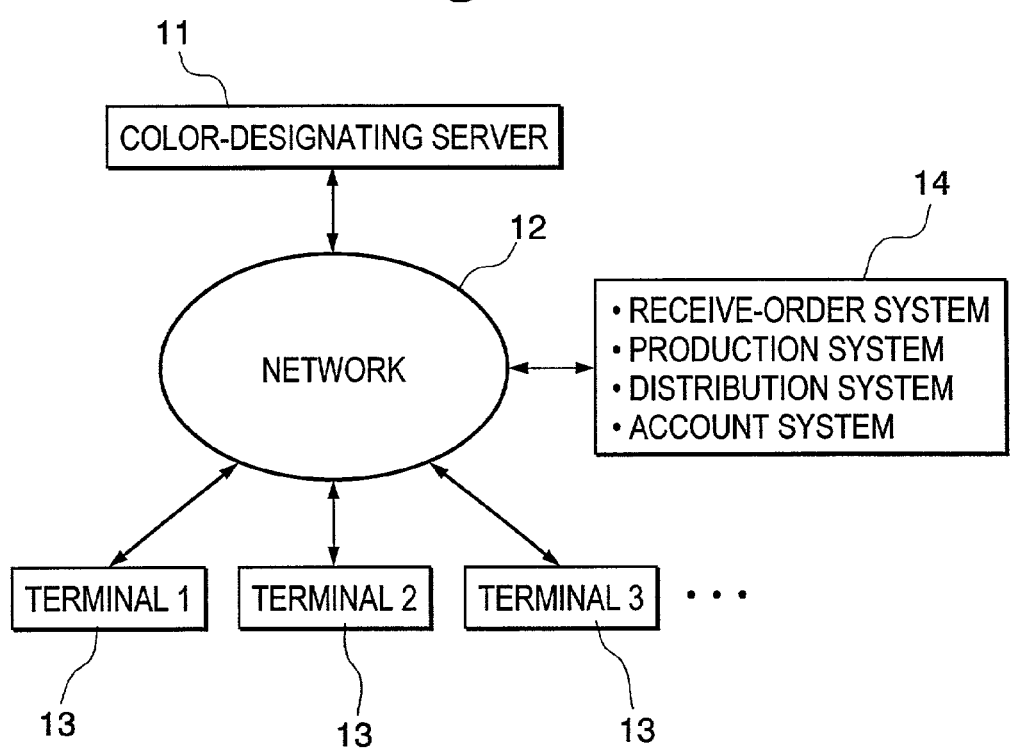
FIG. 1 is a block diagram showing the schematic constitution of a color-designating system using a color-designating server, and receiving/ordering system using the color-designating system, according to an embodiment of the present invention.

Firstly, a receiving/ordering system which uses a color-designating system of a color-designating server will be explained as one embodiment of the present invention. FIG. 1 is a block diagram showing the schematic constitutions of a color-designating system using a color-designating server, and a receiving/ordering system using the color-designating system according to an embodiment of this invention. In FIG. 1, reference code 11 represents a color-designating server which provides a color-designating service via a network 12. Reference code 13 represents user terminals (terminal 1, terminal 2, terminal 3, . . . ) which can access the color-designating server 11 via the network 12. Reference code 14 represents a processing system group which receives orders via the color-designating server and the network 12, and processes received order data, production data, distribution data, and account data.

The operation of the color-designating system, and the receiving/ordering system using the color-designating system, will be explained.

The color-designating server 11 receives a color designation for resin from the user terminals 13, and supplies information relating to availability, delivery data, and the like, via the network 12 and a distribution system in the processing system group 14, to the user terminals 13. The color-designating server 11 also supplies a total cost to the user terminals 13 by communicating via the network and an accounts system in the processing system group 14. Subsequently, when the user confirms the cost and delivery data and transmits his order, the color-designating server 11, communicating via the network 12 and a receiving/ordering system in the processing system group 14, accepts an order for a resin product of the color which was designated in the order, and sends an order to manufacture the resin product included in the receive-order information to a production system in the processing system group 14.

By the method described above, the user can easily use the contents of the system from the color-designating system for the resin in the resin product to the ordering system for producing the resin for the resin product. Furthermore, by receiving availability information from the distribution system, the color-designating server 11 can estimate the delivery data and supply this data to the user. By receiving information from the accounts system, the color-designating server 11 can supply the user with a cost estimate which reflects the price of the resin and dye or pigment.

Subsequently, the constitution and operation of the color-designating server 11 will be explained in greater detail using the drawings.

Figure 2:
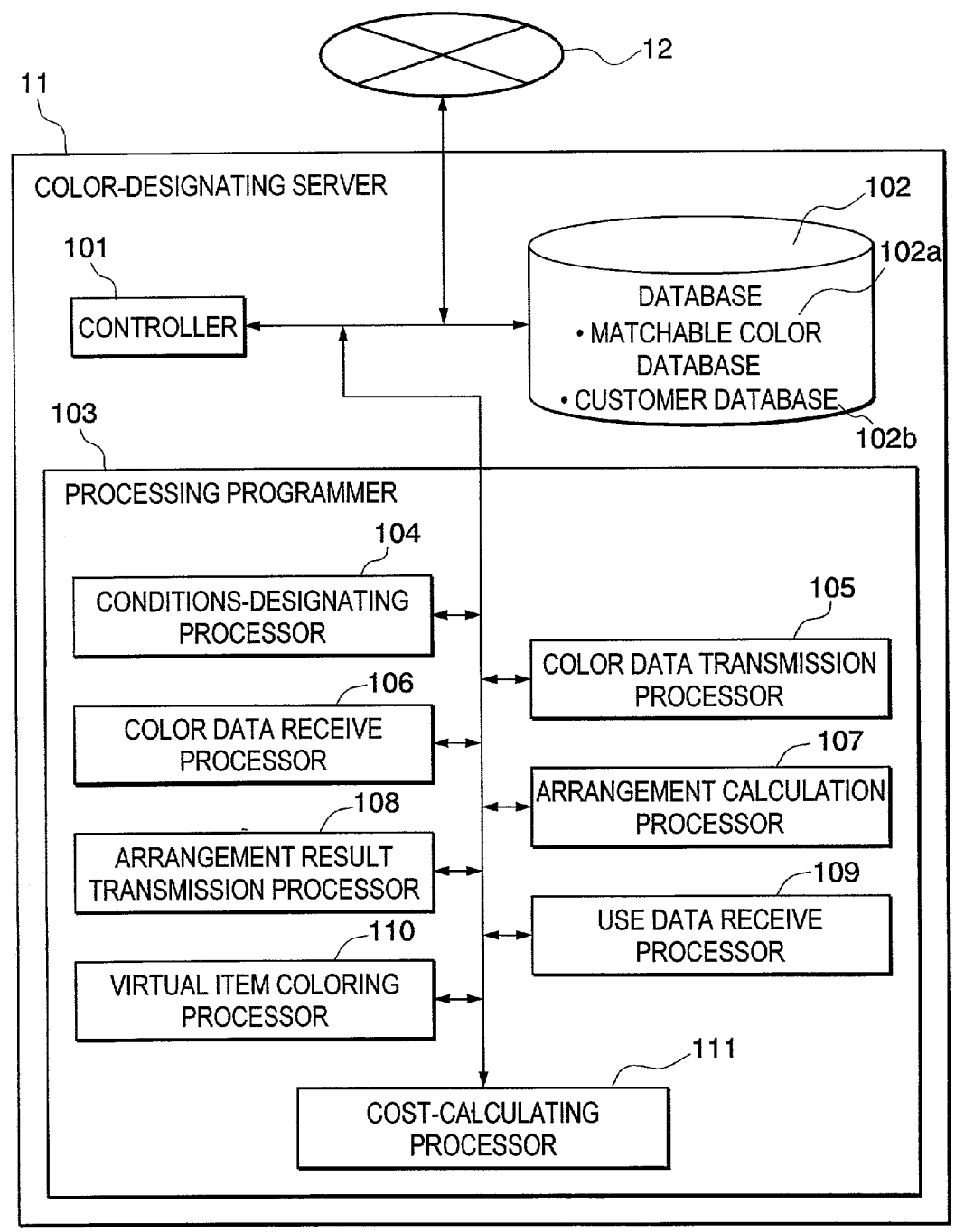
FIG. 2 is a block diagram showing the schematic constitution of a color-designating server according to an embodiment of the present invention.

FIG. 2 is a block diagram showing the schematic constitution of the color-designating server 11 in an embodiment of the present invention. Reference code 101 represents a controller which controls data in the color-designating server 11. Reference code 102 represents a database 102 comprising a matchable color database 102a which stores data needed to determine matchable colors from data such as the type of resin, the type of dye or pigment, and the ratio when matching them, and a customer database 102b, which stores user information comprising use data relating to the product to be colored in correlation with a user ID (identifier) which specifies the user. Reference code 103 represents a processing programmer which executes processing programs to perform various types of processing. The constitution and operation of the processing programmer 103 will be explained in detail later.

One example of the constitution of the database 102 will be explained.

FIGS. 10A and 10B show the constitution of the database 102 in the embodiment of the present invention. Firstly, the constitution of the matchable color database 102a will be explained using FIG. 10A. In FIG. 10A, "resin data" represents data relating to requirements, properties, and cost, which are stored for each type of resin under the following items:

Requirements: shopping bag, vehicle interior, vehicle exterior, home electrical components, power lines, home accessories, . . .

Properties: weather-resistant, hygienic, malleable, environmental concerns, limitations on use (temperature limits etc.), legal restrictions Cost: standard price, set price according to quantity ordered Similarly, data relating to requirements, properties and cost, are stored in various items for "dye or pigment information" and "additives information". "Requirements" need not be limited to those given in the above example, and may include various kinds of information relating to products using resin, such as pipes, flat yarns, marking film, paint, inks, etc. The same goes for "Properties" and "Cost".

"Basic color data" represents data relating to the colors which will become several tens of base types when arranging the resins, dyes or pigments, and additives, and combining these to obtain various colors. Specifically, data relating to raw materials, requirements, properties, cost, and spectral reflection are stored. "Existing color data" represents data relating to colors which have previously been arranged. Specifically, data relating to raw materials, requirements, properties, cost, and spectral reflection are stored. "Raw materials" comprises data relating to the resins, dyes or pigments, and additives, and "spectral reflection data" is data based on the spectral reflectivity of the basic colors and existing colors. "Existing color data" comprises "color sample data" relating to the color of color samples, and relates to the colors which are provided as color samples.

Subsequently, the constitution of the customer database 102b will be explained using FIG. 10B. In FIG. 10B, "user ID" and "password" comprise identification data, registered in order to identify the user. "General data" is data such as the user's name (corporate name), address, contact information, and the like. "Use data" comprises data relating to requirements, molding methods, resin used, and the like, which vary according to the type of business of the user and the like. "History data" comprises data relating to the history of resins previously ordered by each user. "Cost data" relates to individual price data for each of the users, based on previous transaction statistics and order quantities.

Subsequently, the constitution of the processing programmer 103 will be explained in detail.

Reference code 104 represents a conditions-designating processor which transmits to the user terminals 13 a conditions-designating screen for designating conditions data, such as requirements, resin, dye or pigment, which are needed to determine the matchable colors. The conditions-designating processor 104 transmits to the user terminals 13 the conditions-designating screen, wherein the resin and dye or pigment types have been specified based on already-obtained data relating to requirements and the like. Reference code 105 represents a color data transmission processor which consults the matchable color database 102a to determine the matchable colors whose conditions can be determined from the conditions data, based on the conditions data designated in the conditions-designating screen, and transmits the results to the user terminals 13.

The color data transmitting unit provides a color gamut, comprising a region of colors which can be matched from the matchable colors, in a color space, and transmits data for displaying a color-designating screen for enabling colors to be designated in the color gamut to the user terminal.

The color data transmission processor 105 provides a color gamut, comprising a region of colors which can be matched from the matchable colors, in a color space, and transmits data for displaying a color-designating screen for enabling colors to be designated in the color gamut to the user terminals 13. Furthermore, the color data transmission processor 105 consults the matchable color database 102a to determine the color gamut of colors which are matchable from the basic colors under the conditions determined by the conditions data, based on the conditions data designated in the conditions-designating screen, and transmits the results to the user terminals 13. When the user selects a color from the color samples, the color data transmission processor 105 consults the matchable color database 102a to determine the matchable color samples which are matchable under the conditions determined by the conditions data, and transmits the result to the user terminal 13.

Reference code 106 represents a color data receive processor, which receives color data relating to colors designated from the matchable colors from the user terminals 13. Reference code 107 represents an arrangement calculation processor which calculates the arrangement ratio of the resin and dye or pigment based on the received color data. Reference code 108 represents an arrangement result transmission processor which transmits the arrangement result data, output from the arrangement calculation processor 107, to the user terminals 13. Reference code 109 represents a use data receive processor which receives use data relating to items to be colored from the user terminals 13. Reference code 110 represents a virtual item coloring processor which displays virtual items conforming to the actual requirements in two- or three-dimensions to the user terminals 13, colors the virtual items in the color which has been designated from the matchable colors, and allows the color to be confirmed.

Reference code 111 represents a cost-calculating processor which calculates the cost based on data relating to resins and dyes or pigments which is determined uniquely by the arrangement result data, output by the arrangement calculation processor 107. When the cost-calculating processor 111 has calculated the cost, the arrangement result transmission processor 108 includes the cost data, calculates by the cost-calculating processor 111, in the arrangement result data which is transmitted to the user terminals 13.

Each of the processors of the processing programmer 103 may be realized by special hardware, or by a memory and a CPU (central processing unit), programs for realizing the functions of each processor being loaded into the memory and executed.

The memory may comprise a hard disk device, an optical magnetic disk, or a nonvolatile memory such as a flash memory, a recording medium which is capable only of reading, such as a color-designating-ROM, a volatile memory such as an RAM (Random Access Memory), or a computer-readable and computer-writeable recording medium comprised of a combination of the above.

Subsequently, the operation of the color-designating server 11 will be explained.

Figure 3:
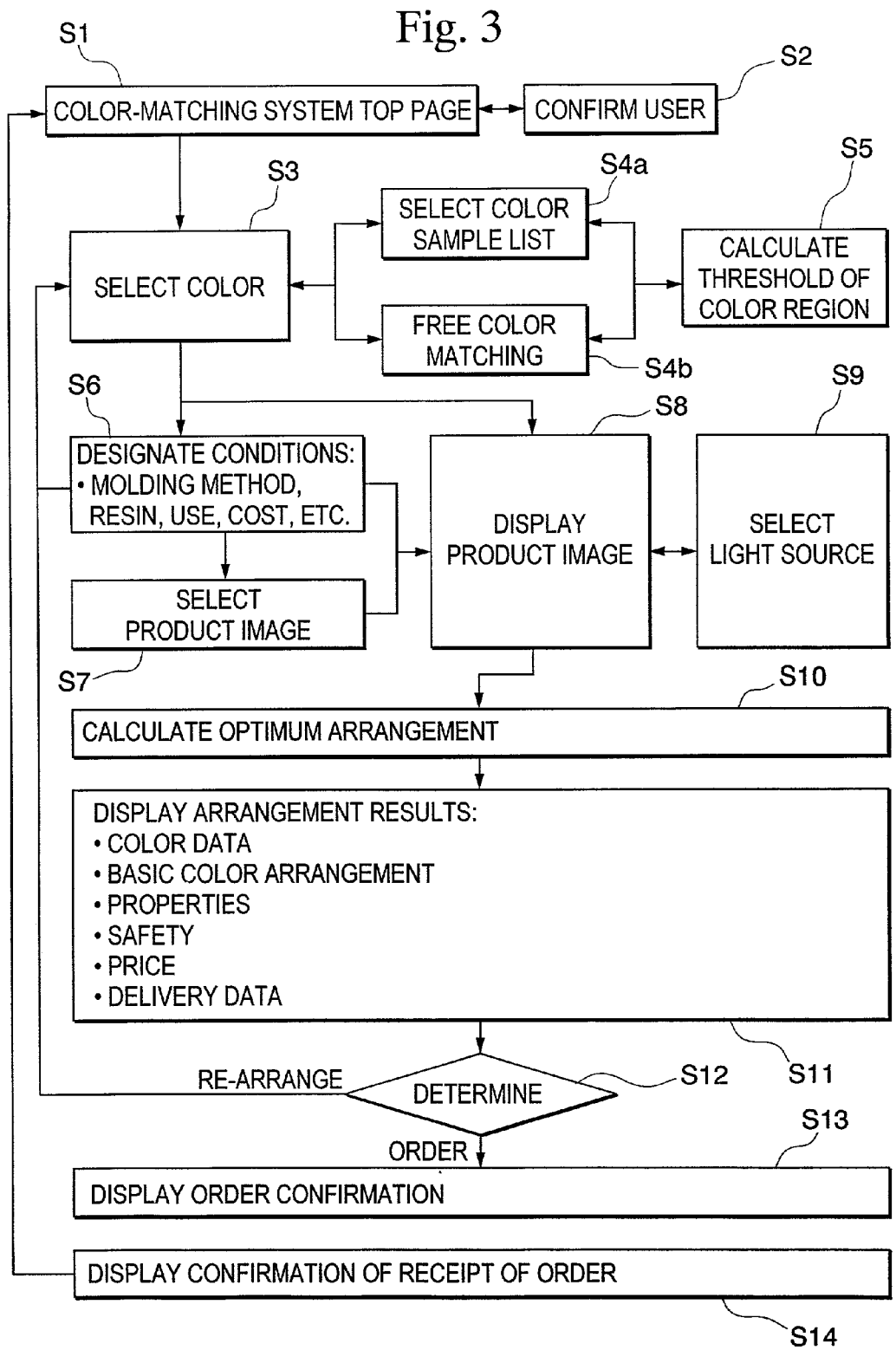
FIG. 3 is a flowchart showing the operation of the color-designating server according to an embodiment of the present invention.
Figure 4:
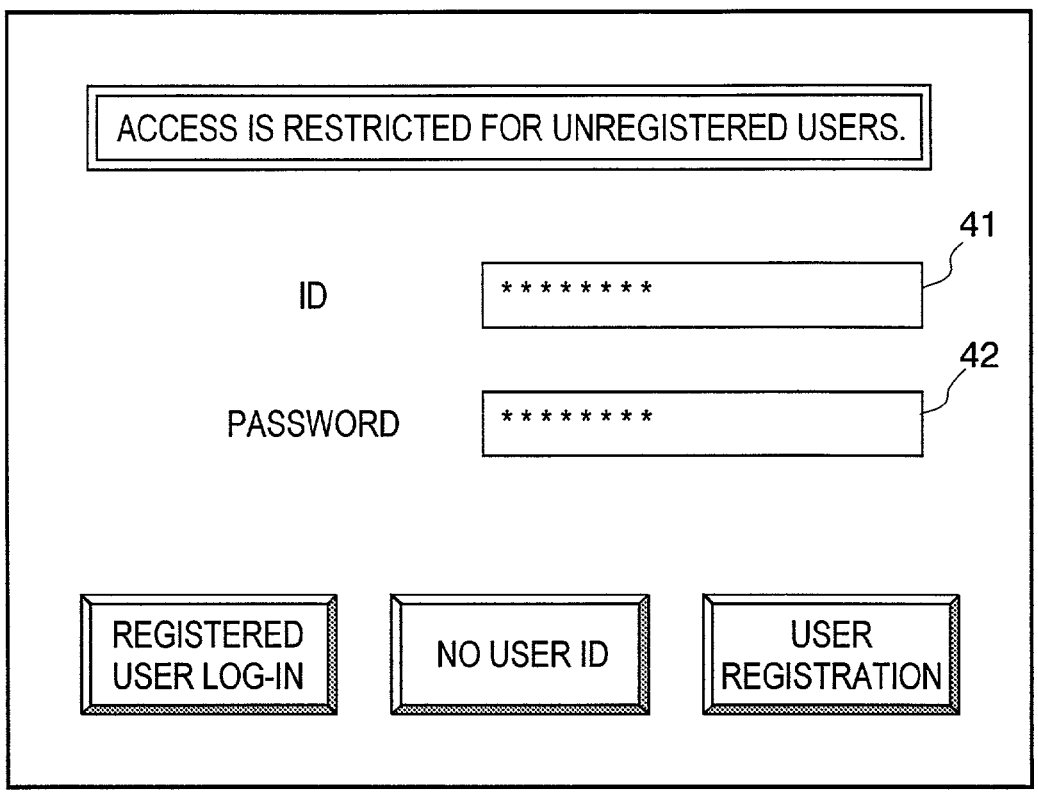
FIG. 4 is a diagram showing an example of a log-in screen which the color-designating server displays to a user terminal according to an embodiment of the present invention.

FIG. 3 is a flowchart showing the operation of the color-designating server 11 in an embodiment of the present invention. When a user terminal 13 has accessed the color-designating server 11, the color-designating server 11 displays the top page of the color-matching system on the user terminal 13 (step S1). Here, when the user uses the color-designating system, the color-designating server 11 displays the log-in screen shown in FIG. 4 to the user terminal 13. In the case where the user has already registered his user ID, the user enters his user ID in the user ID entry box 41 and enters his password in the password entry box 42. Having received this information, the color-designating server 11 and authenticates the user by consulting the customer database 102b and confirming the user ID and password (step S2).

A user having an unregistered user ID is also able to designate colors via the color-designating server 11, but with restrictions e.g. it is not possible for him to calculate cost etc.

Subsequently, when the product requirement for the authenticated user in the "use data" of the customer database 102b is limited to a shopping bag, the color data transmission processor 105 shades the color space to show the color gamut, i.e. the region of colors for the shopping bag which can be matched by combining the resins and dyes or pigments, as for example shown in FIG. 5, and displays the color-designating screen of colors which can be designated in the color gamut to the user terminal 13 (step S3). A variety of methods may be used to designate the colors, such as selecting the desired color from a list of color samples (step S4a), freely matching the color from the color space shown in FIG. 5 (step S4b), RGB color-matching, and the like. Whatever the method of color-designating, a color limit for determining the color gamut is calculated (step S5). Colors can also be designated based on data (such as RGB data) measured by the user himself by means of a spectrophotometer.

Figure 5:
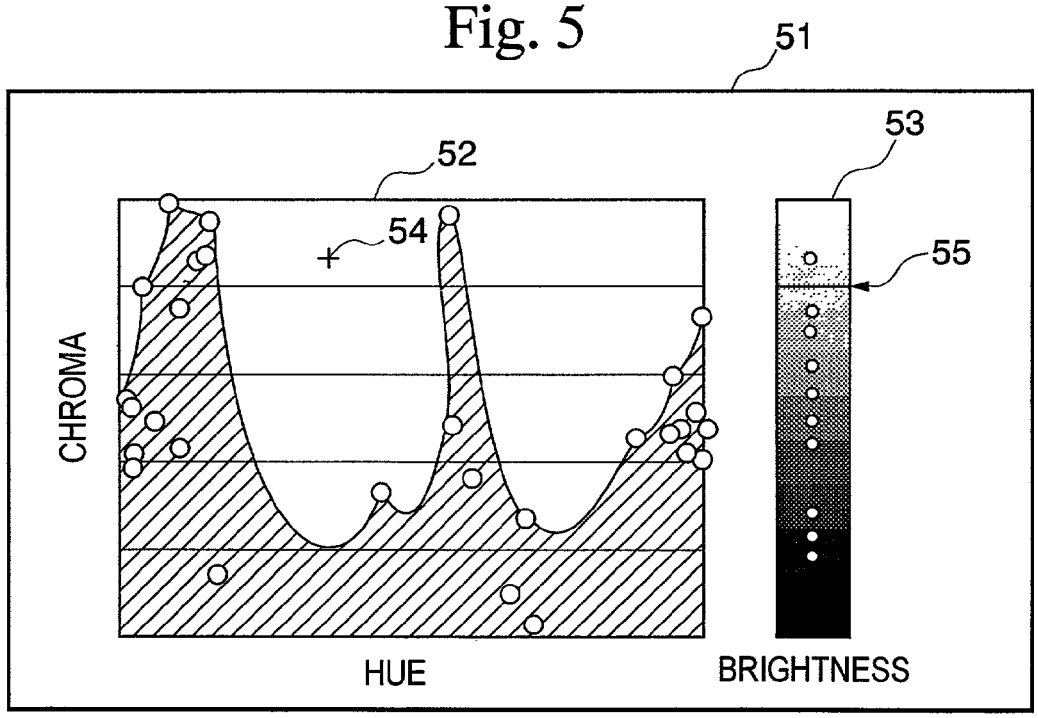
FIG. 5 is a diagram showing an example of a color-designating screen which the color-designating server displays to the user terminal according to an embodiment of the present invention.

FIG. 5 will be explained. FIG. 5 shows one example of a color-designating screen which the color-designating server 11 displays to the user terminal 13 according to an embodiment of this invention. A color-designating screen 51 comprises a color plane 52 having a vertical axis representing chroma and a horizontal axis representing hue, and a brightness-designating box 53 for designating the brightness of the color plane. The color plane 52 and the brightness-designating box 53 form a color space. The circles in the color plane 52 show the position of the basic colors using the resins and dyes or pigments for the shopping bag. The shaded portion in the color plane 52 is the color gamut, which the color data transmission processor 105 determines (color gamut calculation) by consulting the matchable color database 102a to determine the region of colors which can be matched from the basic colors allowed by the resins and dyes or pigments for the shopping bag.

When the user designates a desired point in the color gamut by clicking it with the mouse, a cross-shaped mark 54 is appended in the color plane 52 and the color which is currently being designated is displayed in the color plane 52. The brightness of the color plane 52 is changed by moving a gauge 55 in the brightness-designating box 53 upwards and downwards. At this time, brightness which exceeds that of the uppermost of the circles showing the basic color in the brightness-designating box 53 becomes a region of unmatchable colors.

Subsequently, when the user wishes to set conditions such as which resin to use, the conditions-designating processor 104 transmits a conditions-designating screen restricted to the resins and dyes or pigments for shopping bag shown in FIG. 6 to the user terminal 13. By designating conditions in the conditions-designating screen, the user can avail himself of a color-matching service which takes into consideration a variety of conditions (step S6).

Figure 6:
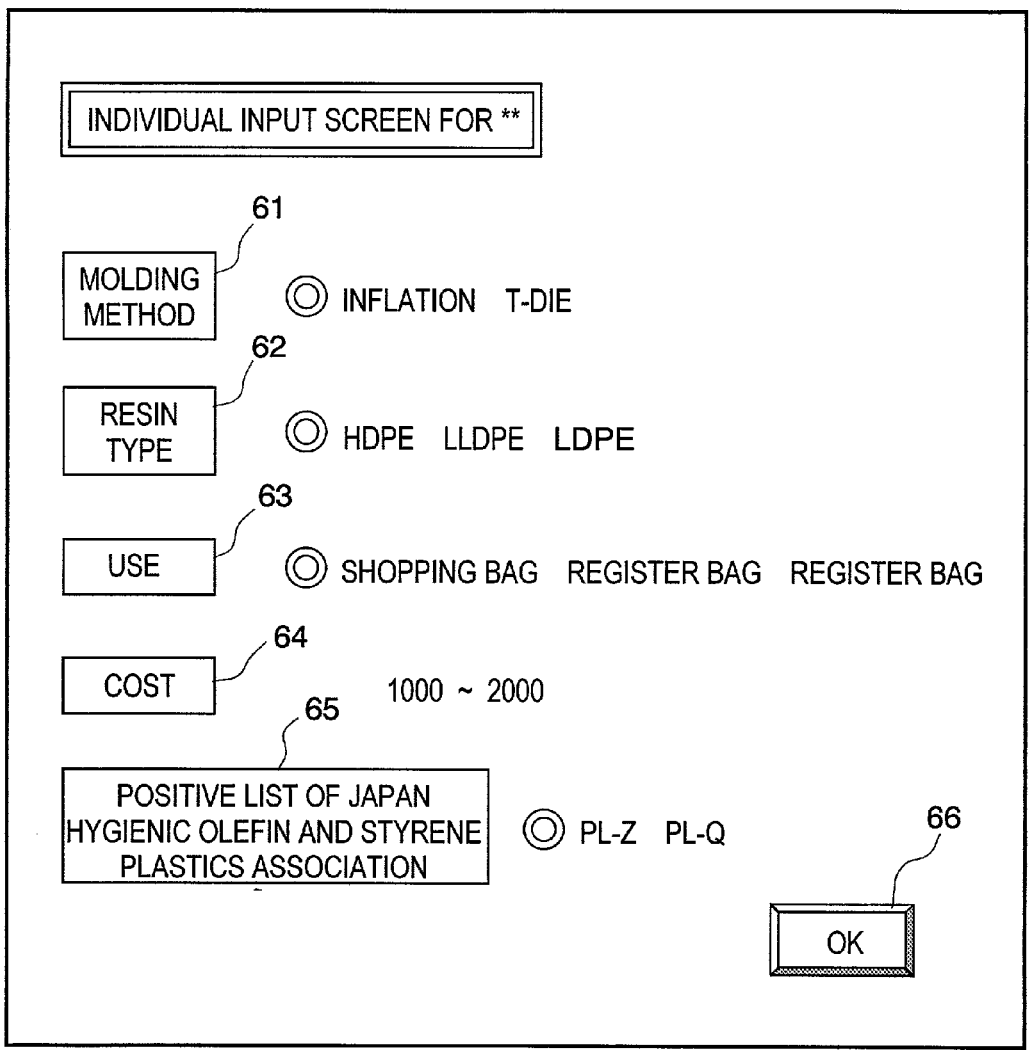
FIG. 6 is a diagram showing an example of a conditions-designating screen which the color-designating server displays to the user terminal according to an embodiment of the present invention.

FIG. 6 will be explained. FIG. 6 shows one example of a conditions-designating screen which the color-designating server 11 displays to the user terminal 13 according to the embodiment of the present invention. Reference code 61 represents a box for selecting a method for molding the resin. In FIG. 6, either "inflation" or "T-die" (T-shaped dice) can be selected as the shopping bag molding method. Reference code 62 represents a box for selecting the resin type. In FIG. 6, the resin type for the shopping bag can be selected from HDPE (high-density polyethylene), LLDPE (linear low-density polyethylene), and LDPE (low-density polyethylene). Reference code 63 represents a requirements-selection box. In FIG. 6, additional requirement for the shopping bag can be selected from shopping bag, register bag, and parcel wrapping. Register bag is a plastic bag provided at counters in convenience stores and the like.

Reference code 64 represents a box for designating the desired cost. The desired price (in yen) per unit weight of resin can be input. The cost designation allows consideration to be given to whether expensive dyes or pigments are needed to obtain the desired color. Reference code 65 represents a box for selecting stipulations and legal restrictions on the shopping bag. In FIG. 6, a selection can be made between PL-Z and PL-Q, which are stipulations of the Positive List of Japan Hygeinic Olefin and Styrene Plastics Association. Reference code 66 represents an OK button to be clicked on using the mouse when the above conditions have been designated prior to proceeding to the next step. In the selection boxes 61, 62, 63, and 65, the double-circle mark of FIG. 6 is appended to an item which has been selecting by clicking the mouse in order to show which item has been selected.

When the specific conditions have been set by the above method in step S6 and the process has returned to the color-section of step S3, the color gamut of matchable colors becomes further restricted by the setting of the above conditions, and the further-restricted color gamut is displayed to the user terminal 13. For instance, a section of the color gamut, which is displayed in the color-section screen, can be matched only by using an expensive dye or pigment. In this section, the user can view changes in the matchable color gamut by changing the cost in the conditions-designating screen, enabling him to find a compromise between cost and color-selection.

Subsequently, when the user has designated "register bag" in the requirements-selection box 63 of step S6, and wishes to confirm the two-dimensional or three-dimensional product image, which has been colored to the designated color and is similar in shape to the actual product desired by the user, on the screen of his user terminal 13, the virtual item coloring processor 110 transmits a virtual item selection screen limited to "register bag" shown in FIG. 7 to the user terminal 13. The user selects the product image in the virtual item selection screen which is closest to the product he actually desires (step S7).

Figure 7:
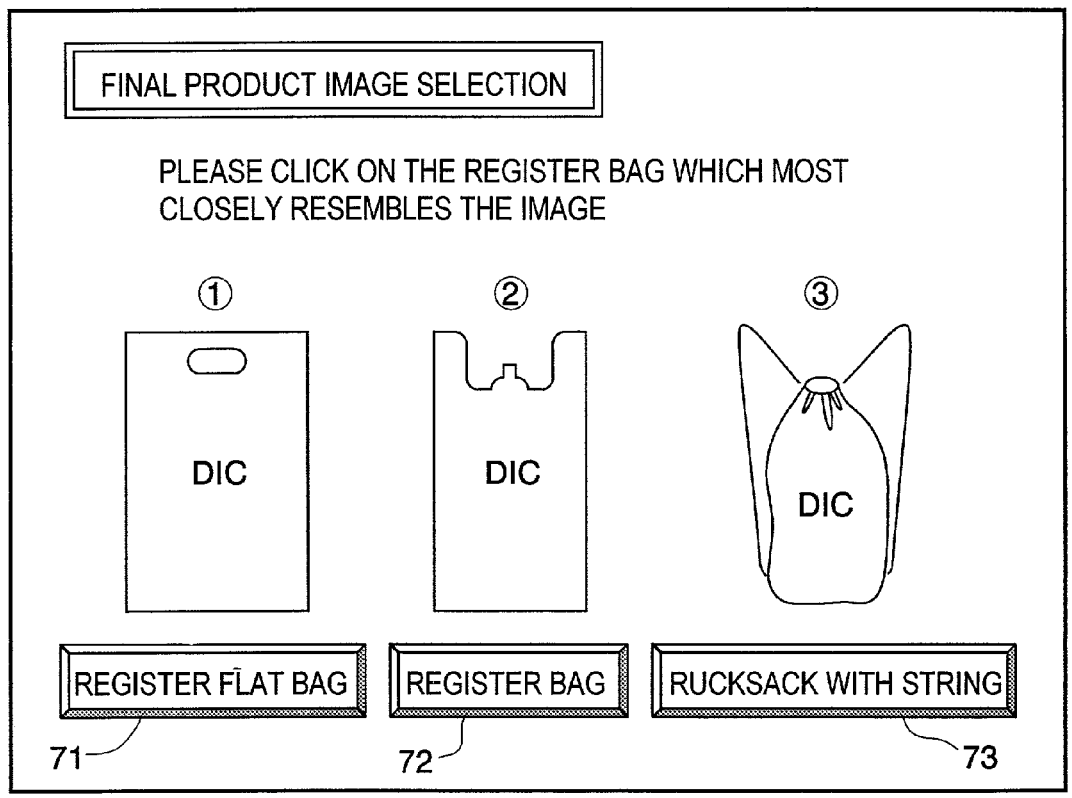
FIG. 7 is a diagram showing an example of a virtual item selection screen which the color-designating server displays to the user terminal according to an embodiment of the present invention.

FIG. 7 will be explained. FIG. 7 shows one example of the virtual item selection screen which the color-designating server 11 displays at the user terminal 13 in an embodiment of the present invention. In FIG. 7, a selection can be made from "register flat bag", "register bag", and "rucksack with string". Reference codes 71, 72, and 73 represent selection button for clicking on with the mouse when selecting from "register flat bag", "register bag", and "rucksack with string".

Subsequently, after the user has designated the color in step S3 and the conditions in step S6, let us suppose that, in step S7, he has selected "register bag" by clicking on the selection button 72. The virtual item coloring processor 110 transmits a selected color confirmation screen shown in FIG. 8, wherein the virtual "register bag" which was selected in step S7 has been colored to the color which was selected in step S3, to the user terminal 13 (step S8). Consequently, the user can confirm the color of the product image in the selected color confirmation screen which is closest to the product he actually desires. When displaying the virtual item, the virtual item coloring processor 110 offers a variety of virtual light-source selections to the user, and displays differences in color achieved by difference in light source to the user terminal 13 (step S9).

Figure 8:
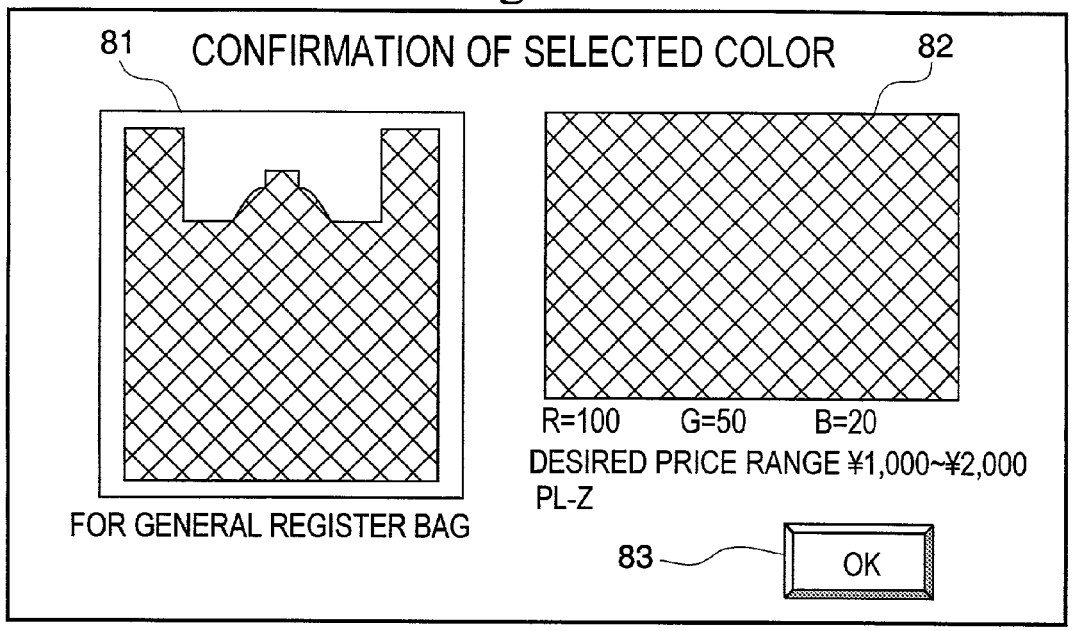
FIG. 8 is a diagram showing an example of a selected color confirmation screen which the color-designating server displays to the user terminal according to an embodiment of the present invention.

FIG. 8 will be explained. FIG. 8 shows one example of a selected color confirmation screen which the color-designating server 11 displays to the user terminal 13 in an embodiment of the present invention. Reference code 81 represents a virtual item display area for displaying virtual items. Reference code 82 represents a selected color display area for displaying the selected color, which the virtual item is colored by. Reference code 83 represents an OK button which the user clicks when he has viewed the screen and decided that this is the color he desires. The selected color confirmation screen enables the user to view a virtual representation of the actual item in the selected color, increasing the precision of his color designation. If he does not like the color, he can return to the color-section screen of step S3 and select another color.

Figure 9:
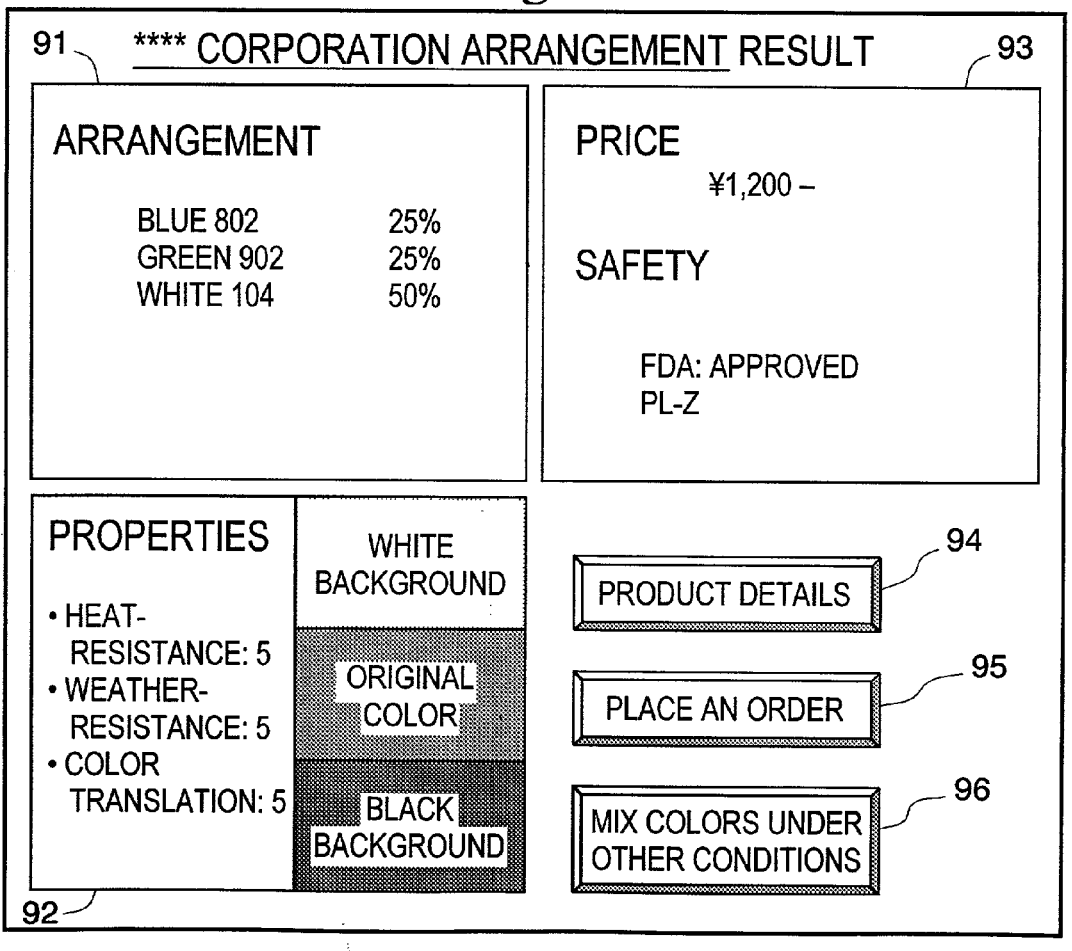
FIG. 9 is a diagram showing an example of an arrangement result screen which the color-designating server displays to the user terminal according to an embodiment of the present invention.

When the OK button 83 has been clicked, the color data receive processor 106 receives color data (including conditions data) relating to the color which has been designated. Based on the color data, the arrangement calculation processor 107 calculates an optimum arrangement of resins, dyes or pigments, and additives, and outputs arrangement result data (step S10). Simultaneously, the cost-calculating processor 111 calculates the cost based on the arrangement result data, and outputs cost data. Subsequently, the arrangement result transmission processor 108 transmits arrangement result screen data, comprising the arrangement result data, output from the arrangement calculation processor 107, and the cost data, output from the cost-calculating processor 111, to the user terminal 13. As a consequence, the arrangement result screen shown in FIG. 9 is displayed at the user terminal 13 (step S11). Incidentally, the arrangement calculation processor 107 may calculate the optimum arrangement based on basic color data obtained by consulting the matchable color database 102a.

FIG. 9 will be explained. FIG. 9 shows one example of an arrangement result screen which the color-designating server 11 displays to the user terminal 13 in an embodiment of this invention. Reference code 91 represents an arrangement display area which shows the arrangement ratio of the basic colors. Reference code 92 represents a properties display area for numerically displaying qualities such as heat-stability, weather-resistance, and color-translation, and for displaying the arranged color (the original color), and the color against a white background and a black background so as to make it possible to confirm that the color has the transparency needed for a register bag. The concealability of the transparency may also be displayed numerically. Reference code 93 represents a price/safety display area for displaying data relating to safety (information relating to various regulations and legal stipulations). The price displayed here is based on the cost data.

Reference code 94 represents a product detail button which the user clicks when he wishes to display more detailed product information (data relating to resin, dyes or pigments, additives, etc.). Reference code 95 represents an order button which the user clicks when ordering a colored resin which satisfies the color, cost, properties, and safety in the arrangement results, displayed in the arrangement result screen. Reference code 96 represents a return button, which the user presses when returning to step S3 to redesignate the color and conditions after the color, cost, and the like of the arrangement results displayed in the arrangement result screen could not been satisfied.

The arrangement result screen enables the user to confirm the properties, price, safety, in addition to the color arrangement and arrangement results.

When the return button 96 of FIG. 9 has been clicked (rearrangement in step S12), the processing returns to step S3 and the conditions and the like are designated (step S6). Furthermore, when the order button 95 of FIG. 9 has been clicked (order in step S12), the color-designating server 11 receives data from the distribution system in the receiving/ordering system 14 via the network 12, estimates a delivery data from the availability data and the like, and displays an order confirmation screen including the delivery data to the user terminal 13 (step S13). When the order has been confirmed as OK, the color-designating server 11 subsequently receives data from the order system in the receiving/ordering system 14 via the network 12, and displays an order-receipt confirmation screen to the user terminal 13 (step S14). By using product numbers to manage the ordered products of each color, subsequent order for products in the same color can be made merely by entering the product numbers. Therefore, the ordering operation can be simplified. Thus the entire sequence of processes from designating the color of the resin to placing an order can be supplied to the user terminal 13 via the network.

The three steps of color-selection (or color-designation), conditions-designation, and product image selection, are not limited to the order described above, and may be executed in any order. The two-dimensional or three-dimensional virtual items may be displayed by using market software. This makes it possible to select color transparency and a light-source type which belong to market software. In the above embodiment, the use data is identified by user ID, but alternatively, the use data may be transmitted from the user terminal 13 and received by the use data receive processor 109. Thereafter, conditions-designating screen data, specifying resins and dyes or pigments based on the received use data, is transmitted to the user terminal 13.

Subsequently, the internal constitution of the processing system group 14 described above, and its operation as relating to the color-designating server, will be explained. The color-designating receiving/ordering system comprises at least the receiving/ordering system and the color-designating server, the constitution and operation of one embodiment of the color-designating receiving/ordering system being described below.

Figure 11:
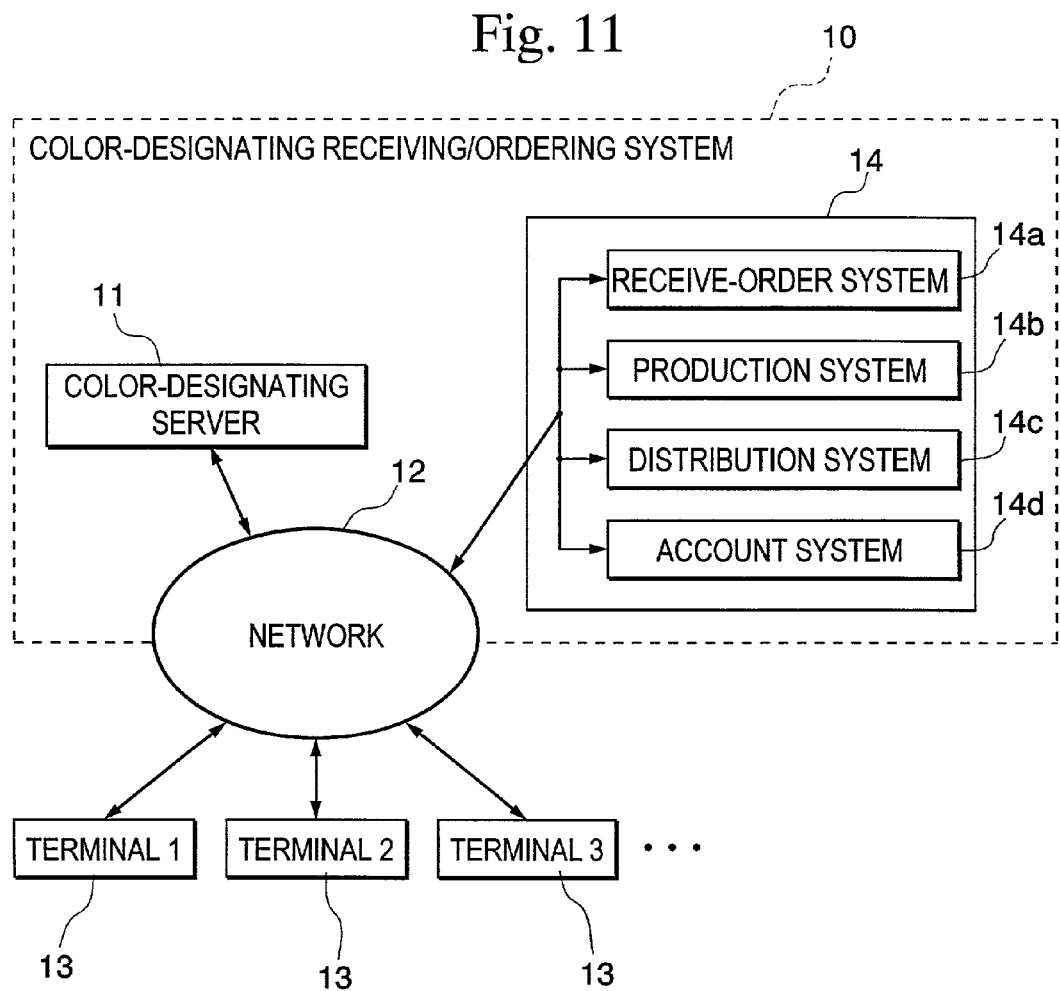
FIG. 11 is a diagram showing the schematic constitution of a color-designating receiving/ordering system according to an embodiment of the present invention.

Firstly, the schematic constitution of the color-designating receiving/ordering system in an embodiment of the present invention will be explained. FIG. 11 shows the schematic constitution of the color-designating receiving/ordering system in an embodiment of the present invention. As shown in FIG. 11, a color-designating receiving/ordering system 10 comprises a color-designating server 11' and a processing system group 14 (comprised of a receive-order system 14a, a production system 14b, a distribution system 14c, and an account system 14d). Transmissions between the systems, and between each system and the color-designating server 11', can be made via a network 12. Transmissions between the system may be sent via special-purpose wires and the like, instead of via the network 12.

Subsequently, the internal constitution of the color-designating server 11' will be explained using the drawings.

Figure 12:
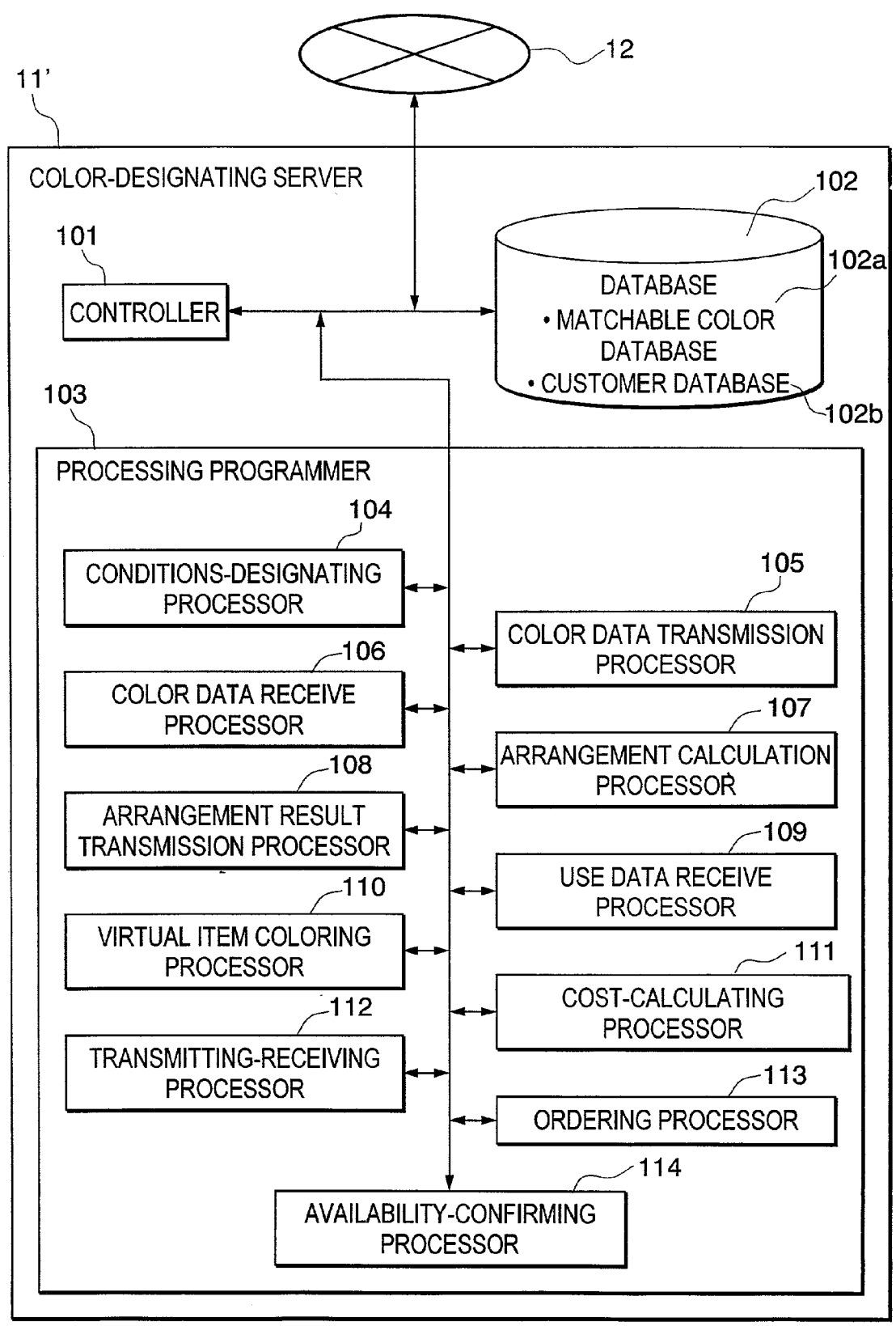
FIG. 12 is a block diagram showing the internal constitution of a color-designating server 11' according to an embodiment of the present invention.

FIG. 12 is a block diagram showing the internal constitution of the color-designating server 11' in an embodiment of the present invention. In FIG. 12, the sections represented by reference codes 101 to 110 have the same constitution and operations as the processors in the color-designating server 11 shown in FIG. 2. The cost-calculating processor 111, in addition to the functions mentioned earlier, communicates with the account system 14d to extract price data for the materials used in the product, and uses the price data in calculating the price of the product and providing this information to the user terminal 13 (price providing unit). Price data is determined from various factors such as the unit price of material or the product price as stipulated by contract with the clients, unit price of the material based on fluctuations in market price, the number of orders for the product, delivery data, etc.

When one or more colors has/have been designated from the matchable colors and the type of product comprising the designated color has been designated at the user terminal 13, a transmitting-receiving processor 112 (receiving unit and transmitting unit) receives designated product data which identifies the designated color(s) and product from the user terminal 13. Furthermore, the transmitting-receiving processor 112 transmits the results of determinations made by the color-designating server 11' to the user terminal 13. An ordering processor 113 transmits order data for ordering a product corresponding to the received designated product data to the receive-order system 14a. An availability-confirming processor 114 extracts availability data for the product corresponding to the designated product data from the distribution system 14c, and determines whether the order is possible.

Subsequently, the internal constitution of the receive-order system 14a will be explained.

Figure 13:
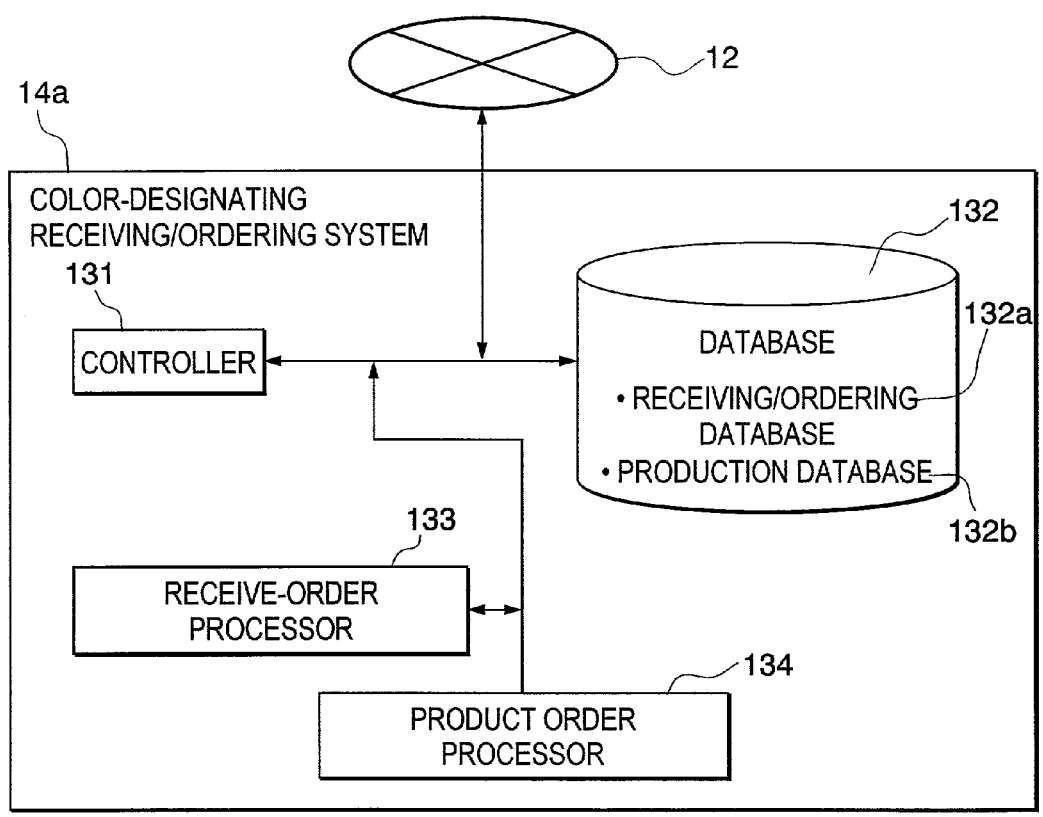
FIG. 13 is a block diagram showing the internal constitution of a receiving/ordering system 14 according to an embodiment of the present invention.

FIG. 13 is a block diagram showing one example of the internal constitution of the receive-order system 14a in an embodiment of the present invention. In FIG. 13, reference code 131 represents a controller which controls data in the receive-order system 14a. Reference code 132 represents a database comprising a receiving/ordering database 132a for storing receive-order data, created by receive-processing of the order data of the product which was received from the color-designating server 11', and product order data for ordering the product from the production system 14b based on the receive-order data, and a production database 132b for storing production data relating to the type of product which can be manufactured, possible manufacture delivery data, description of facilities, and the like, for one or multiple production systems 14b.

Reference code 133 represents a receive-order processor which performs receive-order processing based on the product order data, received from the color-designating server 11', and stores receive-order data, created during the receive-order processing, in the receiving/ordering database 132a. Reference code 134 represents a product order processor which consults the receive data in the receiving/ordering database 132a and the production data in the production database 132b, and creates product order data for commanding the production system 14b to manufacture the product. The product order data, created by the product order processor 134, is stored in the receiving/ordering database 132a.

The production system 14b receives the product order data from the receive-order system 14a, and manufactures the product accordingly. The distribution system 14c manages the available stock numbers of multiple products. In addition, the distribution system 14c receives availability data via the network 12, and responds by sending availability data relating to the specific product. The account system 14d manages information relating to cost, such as product unit price, material unit price, and the like. In addition, the account system 14d receives requests for current price data of material used in the product, which was specified in the designated product data, via the network 12, and responds to the requests by sending the corresponding current price data.

Subsequently, the operation of the color-designating receiving/ordering system 10 will be explained.

FIG. 14 is a flowchart showing the operation of the color-designating receiving/ordering system 10 according to an embodiment of the present invention. The operation of the color-designating receiving/ordering system 10 in FIG. 14 includes the operations of steps S3 and S14 of the color-designating server 11.

Firstly, when the color and type of colored product have been designated at the user terminal 13, the user terminal 13 transmits designated product data, which relates to the designated color and product, to the color-designating server 11' (t1). As already mentioned, the color-designating server 11' specifies which colors can be designated at the user terminal 13. The designated product data may appropriately comprise color data and product classification data which are transmitted in coded format, or the like.

Subsequently, the availability-confirming processor 114 of the color-designating server 11' transmits a request to the distribution system 14c for availability data relating to the type of product which has been designated, and in the designated color, based on the designated product data received by the transmitting-receiving processor 112. Moreover, the cost-calculating processor 111 sends a request for current price data relating to the product in that color to the account system 14d (t2). Consequently, the distribution system 14c transmits the availability data for the product to the color-designating server 11'. The account system 14d transmits current price data, such as the current price of material used in the product, to the color-designating server 11' (t3). The availability-confirming processor 114 of the color-designating server 11' determines whether it is possible to accept the order for the product, based on the received availability data (t4).

When the availability-confirming processor 114 determines that the order is acceptable, the cost-calculating processor 111 calculates a cost for the product which reflects the current price. Subsequently, the color-designating server 11' displays an order confirmation screen for providing data needed in confirming the order, such as the calculated cost, to the user terminal 13 (t5). At the user terminal 13, the user confirms the order confirmation screen and then presses an unillustrated OK button on the screen. Consequently, data showing that the user has confirmed the order is transmitted from the user terminal 13 to the color-designating server 11' (t6). The color-designating server 11' receives this data, and transmits order data for ordering the product corresponding to the designated product data to the receive-order system 14a (t7).

As a result, the receive-order system 14a receives the order data from the color-designating server 11'. Subsequently, the receive-order processor 133 processes the received order based on the received order data, and stores the receive-order data, created during the processing, in the receiving/ordering database 132a (t8). Then, the receive-order system 14a transmits data for confirming the received order, stating that the order has been received and accepted, to the color-designating server 11' (t9). The color-designating server 11' transmits the received order confirmation data, received from the receive-order system 14a, to the user terminal 13 (t10).

Subsequently, the product order processor 134 of the receive-order system 14a consults the receive-order data in the receiving/ordering database 132a and the production data in the production database 132b, creates product order data for commanding the production system 14b to manufacture the product, and processes the order (i.e. transmits the product order data to the production system 14b) at a predetermined time (t11). Consequently, the receive-order system 14a orders the product which the production system 14b will be commanded to manufacture (t12). Subsequently, the production system 14b manufactures the product in compliance with the product order data (t13).

The "predetermined time" mentioned above is, for example, the time of creating the product order data, or the time when the number of orders for the same product has exceeded a threshold level. Further, in the embodiment described above, it is assumed that the production system 14b is outside the company, but commands for production may also be made to the production system 14b which is within the company.

Incidentally, programs for realizing the functions of the processor which performs various types of processing at the processing programmer 103 in FIG. 2 may be recorded in a computer-readable recording medium, and executed by allowing a computer system to read the programs, which are stored in the recording medium. In this case, "computer system" comprises hardware such as an OS or peripheral equipments.

Furthermore, when using a WWW system, "computer system" denotes a website supply environment (or display environment).

A "computer-readable recording medium" may comprise a portable medium such as a floppy disk, an optical magnetic disk, an ROM, and a color-designating-ROM, or a recording device such as a hard disk contained in a computer system. Furthermore, "computer-readable recording medium" may also comprise media for temporarily storing programs, such as a volatile memory (RAM) in a computer system functioning as a server or client in the case where the programs are transmitted via a network, such as the internet, or via a communication line, such as a telephone cable.

The program may be transmitted from a computer system having a recording device or the like which the program is stored in via a transmission medium, or alternatively, by transmission wave along the transmission medium, to another computer system. The "transmission medium" which transfers the program refers to a medium having the function of transmitting data in the manner of a network (communications network) such as the internet, or via a communication line, such as a telephone cable.

The program may acceptably realize some, rather than all, of the functions mentioned above. The functions may be realized in combination with programs which are already recorded in the computer system by using a differentiating file (differentiating program).

In the color-designating system of the present invention, the display apparatuses which are provided in the color-designating server 11 and the user terminal 13 carry out calibration for strict color control. Calibration uses commercially available special-purpose tools and the like to correct errors (caused by difference in apparatus type or individual differences), which are displayed as very small differences in color even between identical RGB data. This enables the user to designate colors with high precision. Recently developed specifications such as sRGB, which facilitate the construction of computer systems capable of absorbing color differences between different types of device, may also be used.

The specific constitution of the present invention is not limited to that described in the above embodiments, and may be modified in various ways without deviating from the scope and spirit of the invention.

As described above, the color-designating server of the present invention comprises a matchable color database which stores data required for determining matchable colors; a conditions-designating processing unit which transmits the conditions-designating screen for designating conditions data, required for determining the matchable colors, to the user terminal; and a color data transmitting unit which determines colors which can be matched under the conditions specified by the conditions data, designated in the conditions-designating screen, by consulting the matchable color database, and transmits a result to the user terminal. Therefore, the conditions data for adding restrictions, such as requirements, is received based on data stored in the matchable color database, thereby enabling data relating to colors which can be matched within the restrictions of the conditions data to be supplied to the user. As a consequence, it is possible to reduce wasteful operations on the ordering and receiving sides, such as a case where a user designates an unmatchable color and places an order to match that color.

Further, in the color-designating server of the present invention, the data required for determining the matchable colors comprises at least the type of resin, the type of dye or pigment, and the ratio when matching them. Therefore, data relating to the matchable colors can be supplied to the user by receiving conditions data relating to the resins and dyes or pigments and the like. As a consequence, the user can obtained data relating to colors which can be matched by using conventionally-used resins. Moreover, wasteful operations on the ordering and receiving sides, such as a case where a user designates an unmatchable color and places an order to match that color, can be reduced.

Further, in the color-designating server of the present invention, the color data transmitting unit provides a color gamut, comprising a region of colors which can be matched from the matchable colors, in a color space, and transmits data for displaying a color-designating screen for enabling colors to be designated in the color gamut to the user terminal. Therefore, it is easy to visually inform the user of the range of matchable colors. As a consequence, the user can visually understand how much of the color space can be color-matched.

Further, in the color-designating server of the present invention, the matchable color database further stores basic color data relating to a plurality of basic colors, determined by combining resins and dyes or pigments, and the color data transmitting unit determines a color gamut, comprising a region of matchable colors which can be matched from the basic colors under the conditions determined by the conditions data, by consulting the matchable color database, and transmits the result to the user terminal. Therefore, data relating to the matchable colors can be determined more accurately when using a variety of methods for matching colors by arranging combinations of multiple basic colors. As a consequence, in matching a color from the basic colors, the color gamut can be determined by using basic color data.

Further, in the color-designating server of the present invention, the matchable color database further stores color sample data relating to colors of color samples; and the color data transmission unit determines color samples which can be matched under the conditions, determined by the conditions data, by consulting the matchable color database, and transmits the result to the user terminal. Therefore, colors can easily be selected from the color samples which are prepared from actual resin color samples. As a consequence, arrangement data and the like relating to color samples, which were prepared beforehand as existing samples, can be used unaltered, reducing the cost of new color-matching.

Further, the color-designating server of the present invention further comprises a color data receiving unit which receives color data relating to a color which was designated from the matchable colors; an arrangement calculating unit which calculates an arrangement ratio of resins and dyes or pigments based the received color data; and an arrangement result transmitting unit which transmits arrangement result data, output from the arrangement calculating unit, to the user terminal. Therefore, it is possible to inform the user of arrangement ratio data and arrangement result data in the resin of the color he desires. As a consequence, cost data, performance data, and safety data, which determine the arrangement of resins and dyes or pigments, can be sent to the user in one package, enabling him to make an overall decision.

Further, the color-designating server of the present invention further comprises a use data receiving unit which receives use data relating to an item to be colored from the user terminal, and the conditions-designating processing unit transmits the conditions-designating screen, specifying the types of resin and dye or pigment in accordance with the use data, to the user terminal. Therefore, the user can easily make a selection from pre-restricted resins and dyes or pigments. Moreover, various conditions can be set in accordance with requirements. As a consequence, conditions can be set for individual requirements, and the user can easily select resin after considering various special conditions and the like with respect to many types of products and many requirements for the resin.

Further, the color-designating server of the present invention further comprises a customer database which stores user information, comprising use information relating to items to be colored, in correlation with user ID, specifying users of the color-designating server. When the user has been identified, the conditions-designating processing unit transmits the conditions-designating screen, specifying the types of resin and dye or pigment in accordance with the use data of the user, which was obtained by consulting the customer database, to the user terminal. Therefore, conditions can be set by displaying only information relating to resins, dye or pigment, and the like, which is of relevance to the user, based on the user's field of business, previous orders, and the like. As a consequence, it becomes possible to adjust the types of conditions which each user can select.

Further, in the color-designating server of the present invention, the conditions-designating processing unit transmits the conditions-designating screen further comprising means of designating requirements, according to the requirements of the user, obtained by consulting the customer database. Therefore, the user can further restrict the conditions displayed in the conditions-designating screen relating to resins, dyes or pigments, and the like, which are of relevance to himself. As a consequence, a great many types of resins can be narrowed to a certain extent, making it easier for the user to select the resin.

Further, the color-designating server of the present invention further comprises a virtual item coloring processing unit which displays a virtual item conforming to actual requirements in two-dimensions or three-dimensions in the color-designating screen, colors the virtual item in the color which has been designated from the matchable colors, and allows the color to be confirmed. Therefore, it is possible to designate color by using an image of the manufactured product. As a consequence, the user can designate the color more accurately.

Further, the color-designating server of the present invention further comprises a cost-calculating unit which calculates a cost based on data relating to resins and dyes or pigments which is determined uniquely by arrangement result data, output by the arrangement calculation processing unit, and the arrangement result transmitting unit transmits the arrangement result data including cost data. Therefore, the user can obtain cost data simultaneous to designating the color of the resin. As a consequence, the user can designate the color after considering the cost.

Further, a color-designating receiving/ordering system of the present invention comprises at least a color-designating server which displays a screen for designating color at a user terminal, which can be connected to a network, and a receive-order system which receives order data, received from the user terminal by the color-designating server. The color-designating server comprises a matchable color database which stores data required for determining matchable colors; a conditions-designating processing unit which transmits a conditions-designating screen for designating conditions data, required for determining the matchable colors, to the user terminal; and a color data transmitting unit which determines colors which can be matched under the conditions specified by the conditions data, designated in the conditions-designating screen, by consulting the matchable color database, and transmits a result to the user terminal; a receiving unit which, when a color has been designated from the matchable colors, and a product in the color has been designated, receives designated product data for specifying the color and the product, and order data, from the user terminal; and a transmitting unit which transmits the designated product data and the order data to the receive-order system; the receive-order system comprising a receive-order unit which performs receive-order processing based on the order data, which has been received. Therefore, the order for the color and product which have been designated by the color-designating server, can be processed, and the receive-order system can receive-process the product. As a consequence, order data for a product having a precisely-designated color can be received via the network, and the order can be automatically receive-processed based on the order data.

Further, the color-designating receiving/ordering system further comprises a distribution system which manages the stock number of the products; and the color-designating server further comprises an available stock confirming unit which extracts stock data of a product corresponding to the designated product data from the distribution system, and determines whether it can be ordered; and a transmitting unit which transmits the result of the determination to the user terminal. Therefore, it is possible to incorporate the stock data of the distribution system and thereby prevent the placing of pointless orders, such as an order for a product which is not in stock. As a consequence, it becomes possible to monitor discrepancies between the number of orders, and stock numbers, for each product. This increases the ordering efficiency and stock efficiency.

Further, the color-designating receiving/ordering system further comprises an account system which manages data relating to the cost of the product; and the color-designating server further comprises a price supplying unit which extracts current price data of materials used in a product, which has been specified in the product-product data, from the account system, and supplies a price of the product reflecting the current price to the user terminal. Therefore, it is possible to provide the user with a product price which uses a current price reflecting contracts with the clients, and the like. As a consequence, an accurate product price can be provided for each client. Moreover, discount prices can be offered to specific clients.

Further, in the color-designating receiving/ordering system of the present invention, the receive-order system further comprises a product ordering unit which creates product order data for issuing a command to manufacture a product based on receive-order data, processed by the receive-order unit, and performs order-processing. The color-designating receiving/ordering system further comprises a manufacturing system which receives the product order data from the receive-order system, and manufactures a product based on the product order data. Therefore, it is possible to provide services from receiving a product order, including color-designation, from the user terminal, to transmitting a command to manufacture the product to the manufacturing system. As a consequence, the time from after the color of the product has been designated until the start of manufacturing can be shortened, enabling the delivery data to be brought forward.

What is claimed is:

1. A color-designating server for designating color of a product to be manufactured, which displays a screen for designating color at a user terminal, which can be connected to a network, the color-designating server comprising:

a processor program for receiving information directed to a product to be manufactured;

a matchable color database which stores data required for determining matchable colors;

a conditions-designating processing unit which transmits a conditions-designating screen for designating conditions data, required for determining the matchable colors, to the user terminal in which the conditions data displayed on the conditions-designating screen includes use information specified for a user;

a color data transmitting unit which determines colors which can be matched under the conditions specified by the conditions data, designated in the conditions-designating screen, by consulting the matchable color database, and transmits a result to the user terminal; and a customer database which stores user information, the user information comprising a user ID for specifying users of the color-designating server and said use information, the use information including requirements relating to items to be colored predetermined in correlation with the user ID, and types of resin and dye or pigment which can be used in dependence upon the requirements;

wherein, the user has been identified, the conditions-designating processing unit transmits the conditions-designating screen to the user terminal, wherein the requirements and the types of resin and dye or pigment are stored in the customer database in correlation with the identified user, so that the user can designate the conditions data by selecting it from a range specified by the requirements and the types of resin and dye or pigment displayed on the conditions-designating screen, and wherein the color-designating server comprises a use data receiving unit which receives, from the user terminal, the conditions data designated by the user.

2. The color-designating server according to claim 1, wherein the conditions data further comprises the ratio of resin and the dye or pigment when matching them.

3. The color-designating server according to claim 1, wherein the color data transmitting unit provides a color gamut, comprising a region of colors which can be matched from the matchable colors, in a color space, and transmits data for displaying a color-designating screen for enabling colors to be designated in the color gamut to the user terminal.

4. The color-designating server according to claim 1, wherein the matchable color database further stores basic color data relating to a plurality of basic colors, determined by combining resins and dyes or pigments; and the color data transmitting unit determines a color gamut, comprising a region of matchable colors which can be matched from the basic colors under the conditions determined by the conditions data, by consulting the matchable color database, and transmits the result to the user terminal.

5. The color-designating server according to claim 1, wherein the matchable color database further stores color sample data relating to colors of color samples; and the color data transmission unit determines color samples which can be matched under the conditions, determined by the conditions data, by consulting the matchable color database, and transmits the result to the user terminal.

6. The color-designating server according to claim 1, further comprising a color data receiving unit which receives color data relating to a color which was designated from the matchable colors;

an arrangement calculating unit which calculates an arrangement ratio of resins and dyes or pigments based the received color data; and an arrangement result transmitting unit which transmits arrangement result data, output from the arrangement calculating unit, to the user terminal.

7. The color-designating server according to claim 1, further comprising a virtual item coloring processing unit which displays a virtual item conforming to actual requirements in two-dimensions or three-dimensions in the color-designating screen, colors the virtual item in the color which has been designated from the matchable colors, and allows the color to be confirmed.

8. The color-designating server according to claim 1, further comprising a cost-calculating unit which calculates a cost based on data relating to resins and dyes or pigments which is determined uniquely by arrangement result data, output by the arrangement calculation processing unit;

the arrangement result unit transmitting the arrangement result data including cost data.

9. A color-designating receiving/ordering system for designating color of a product to be manufactured, comprising at least a color-designating server which displays a screen for designating color at a user terminal, which can be connected to a network, and a receive-order system which receives order data, received from the user terminal by the color-designating server, the color-designating server comprising:

a processor program for receiving information directed to a product to be manufactured;

a matchable color database which stores data required for determining matchable colors;

a conditions-designating processing unit which transmits a conditions-designating screen for designating conditions data, required for determining the matchable colors, to the user terminal in which the conditions data displayed on the conditions-designating screen includes use information specified for a user; and a color data transmitting unit which determines colors which can be matched under the conditions specified by the conditions data, designated in the conditions-designating screen, by consulting the matchable color database, and transmits a result to the user terminal;

a receiving unit which, when a color has been designated from the matchable colors, and a product in the color has been designated, receives designated product data for specifying the color and the product, and order data, from the user terminal;

a transmitting unit which transmits the designated product data and the order data to the receive-order system;

the receive-order system comprising a receive-order unit which performs receive-order processing based on the order data, which has been received;

a customer database which stores user information, the user information comprising a user ID for specifying users of the color-designating server, and said use information, the use information including requirements relating to items to be colored predetermined in correlation with the user ID, and types of resin and dye or pigment which can be used in dependence upon the requirements; and wherein, the user has been identified, the conditions-designating processing unit transmits the conditions-designating screen to the user terminal, wherein the requirements and the types of resin and dye or pigment are stored in the customer database in correlation with the identified user, so that the user can designate the conditions data by selecting it from a range specified by the requirements and the types of resin and dye or pigment displayed on the conditions-designating screen, and wherein the color-designating server comprises a use data receiving unit which receives, from the user terminal, the conditions data designated by the user.

10. The color-designating receiving/ordering system according to claim 9, further comprising a distribution system which manages the stock number of the products;

the color-designating server further comprising an available stock confirming unit which extracts stock data of a product corresponding to the designated product data from the distribution system, and determines whether it can be ordered; and a transmitting unit which transmits the result of the determination to the user terminal.

11. The color-designating receiving/ordering system according to claim 9, further comprising an account system which manages data relating to the cost of the product; and the color-designating server further comprising a price supplying unit which extracts current price data of materials used in a product, which has been specified in the product-product data, from the account system, and supplies a price of the product reflecting the current price to the user terminal.

12. The color-designating receiving/ordering system according to claim 9, further comprising a manufacturing system which receives receive-order data from the receive-order system, and manufactures a product based on the receive-order data.

13. A color-designating method for designating color of a product to be manufactured, which displays a screen for designating color at a user terminal, which can be connected to a network, the color-designating method comprising the steps of:

designating a product to be colored;

specifying users of the color-designating server by accessing a customer database which stores user information, the user information comprising a user ID for specifying users of the color-designating server and use information, the use information including requirements relating to items to be colored, predetermined in correlation with the user ID, and types of resin and dye or pigment which can be used in dependence upon the requirements;

when a user has been identified, transmitting a conditions-designating screen for designating conditions data, required for determining matchable colors, to the user terminal in which the conditions data displayed on the conditions-designating screen includes use information specified for the user, the conditions-designating screen displays said use information which includes the requirements and the types of resin and dye or pigment, which are stored in the customer database in correlation with the identified user, so that the user can designate the conditions data by selecting it from a range specified by the requirements and the types of resin and dye or pigment displayed on the conditions-designating screen; and determining colors which can be matched under the conditions specified by the conditions data, designated in the conditions-designating screen, by consulting a matchable database, and transmitting the result to the user terminal.

14. The color-designating method according to claim 13, the second step comprising providing a color gamut, comprising a region of colors which can be matched from the matchable colors, in a color space, and transmitting data for displaying a color-designating screen for enabling colors to be designated in the color gamut to the user terminal.

15. A color-designating receiving/ordering method for designating color of a product to be manufactured, using a color-designating server which displays a screen for designating color at a user terminal, which can be connected to a network, and a receive-order system which receives order data, received from the user terminal by the color-designating server, the color-designating receiving/ordering method comprising the steps of:

designating a product to be colored;

specifying users of the color-designating server by accessing a customer database which stores user information, the user information comprising a user ID for specifying users of the color-designating server and use information, the use information including requirements relating to items to be colored, predetermined in correlation with the user ID, and types of resin and dye or pigment which can be used in dependence upon the requirements;

when a user has been identified, transmitting by a color-designating server a conditions-designating screen for designating conditions data, required for determining matchable colors, to the user terminal in which the conditions data displayed on the conditions-designating screen includes use information specified for the user, the conditions-designating screen specifying said use information which includes the requirements and the types of resin and dye or pigment which are stored in the customer database in correlation with an identified user and were obtained by consulting the customer database;

the conditions-designating screen displays said use information which includes the requirements and the types of resin and dye or pigment, which are stored in the customer database in correlation with the identified user, so that the user can designate the conditions data by selecting it from a range specified by the requirements and the types of resin and dye or pigment displayed on the conditions-designating screen; and when a color has been designated from the matchable colors, and a product in the color has been designated, the color-designating server receiving designated product data for specifying the color and the product, and order data, from the user terminal;

the color-designating server transmitting the designated product data and the order data to the receive-order system; and the receive-order system performing receive-order processing based on the order data, which has been received.

16. A computer-readable recording medium, which a program of color-designating method for designating color of a product to be manufactured by displaying a screen for designating color at a user terminal, which can be connected to a network, is recorded in, the program comprising the steps of:

designating a product to be colored;

specifying users of the color-designating server by accessing a customer database with stores user information, the user information comprising a user ID for specifying users of the color-designating server and use information, the use information including requirements relating to items to be colored, predetermined in correlation with the user ID, and types of resin and dye or pigment which can be used in dependence upon the requirements;

when a user has been identified, transmitting a conditions-designating screen for designating conditions data, required for determining matchable colors, to the user terminal in which the conditions data displayed on the conditions-designating screen includes use information specified for the user, the conditions-designating screen displays the requirements and the types of resin and dye or pigment, which are stored in the customer database in correlation with the identified user, so that the user can designate the conditions data by selecting it from a range specified by the requirements and the types of resin and dye or pigment displayed on the conditions-designating screen; and determining colors which can be matched under the conditions specified by the conditions data, designated in the conditions-designating screen, by consulting a matchable color database, and transmitting the result to the user terminal.

\* \* \* \* \*